(12) United States Patent
Graaf et al.

(10) Patent No.: US 9,242,527 B2
(45) Date of Patent: Jan. 26, 2016

(54) REFRIGERANT CIRCUIT OF AN HVAC SYSTEM OF A MOTOR VEHICLE

(75) Inventors: Marc Graaf, Krefeld (DE); Florian Wieschollek, Hürth (DE); Christian Rebinger, Neusäβ (DE); Dirk Schroeder, Manching (DE)

(73) Assignee: Hanon Systems, Daejeon-si (KR)

( * ) Notice: Subject to any disclaimer, the term of this patent is extended or adjusted under 35 U.S.C. 154(b) by 733 days.

(21) Appl. No.: 13/267,934

(22) Filed: Oct. 7, 2011

(65) Prior Publication Data
US 2012/0085114 A1   Apr. 12, 2012

(30) Foreign Application Priority Data
Oct. 7, 2010   (DE) .......................... 10 2010 042 127

(51) Int. Cl.
*B60H 1/00* (2006.01)
*B60H 1/14* (2006.01)
*B60H 1/32* (2006.01)
*F25B 41/04* (2006.01)
(Continued)

(52) U.S. Cl.
CPC ............ *B60H 1/00278* (2013.01); *B60H 1/143* (2013.01); *B60H 1/323* (2013.01); *B60H 1/00914* (2013.01); *B60H 2001/00307* (2013.01); *B60H 2001/00928* (2013.01); *B60H 2001/00949* (2013.01); *F25B 5/00* (2013.01); *F25B 5/02* (2013.01); *F25B 41/043* (2013.01); *F25B 43/006* (2013.01)

(58) Field of Classification Search
CPC .......... F25B 5/02; F25B 41/0435; F25B 5/00; F25B 43/006; B60H 2001/00949; B60H 1/00914; B60H 2001/00928; B60H 1/323

USPC ......... 62/196.1, 197, 199, 200, 117; 165/202, 165/42
See application file for complete search history.

(56) References Cited

U.S. PATENT DOCUMENTS 3,882,691 A * 5/1975 Baines et al. .................. 62/225
4,987,751 A * 1/1991 Lewen ............................ 62/502
(Continued)

FOREIGN PATENT DOCUMENTS

CN           1636777 A      7/2005
CN         100439136 C     12/2008
(Continued)

*Primary Examiner* — Marc Norman
*Assistant Examiner* — Max Snow
(74) *Attorney, Agent, or Firm* — Fraser Clemens Martin & Miller LLC; James D. Miller

(57) ABSTRACT

The invention relates to a refrigerant circuit and a process for operation of the refrigerant circuit of an HVAC system of a vehicle, particularly an electric or hybrid vehicle. The refrigerant circuit includes a primary circuit with a compressor, a heat exchanger for heat transmission between the refrigerant and the environment, a collector, a first expansion member, a heat exchanger for supply of heat from the fresh air to be conditioned of the vehicle interior to the refrigerant and a heat exchanger arranged switched in parallel to the heat exchanger. Further, the refrigerant circuit is provided with a secondary train that extends starting from a tapping point positioned between the compressor and the heat exchanger up to a connection point and is provided with a heat exchanger for heat transmission from the refrigerant to the fresh air to be conditioned for the vehicle interior, and a subsequent control valve.

11 Claims, 6 Drawing Sheets

(51) Int. Cl.
*F25B 43/00* (2006.01)
*F25B 5/00* (2006.01)
*F25B 5/02* (2006.01)

(56) References Cited

U.S. PATENT DOCUMENTS

| | | | |
|---|---|---|---|
| 6,178,761 B1* | 1/2001 | Karl | 62/159 |
| 6,568,198 B1* | 5/2003 | Tadano et al. | 62/217 |
| 6,758,054 B2* | 7/2004 | Zheng et al. | 62/199 |
| 7,975,757 B2* | 7/2011 | Nemesh et al. | 165/42 |
| 8,511,077 B2* | 8/2013 | Schwarzkopf | 60/320 |
| 2001/0003311 A1* | 6/2001 | Karl | 165/202 |
| 2004/0129012 A1* | 7/2004 | Feuerecker | 62/278 |
| 2005/0034473 A1* | 2/2005 | Casar et al. | 62/324.1 |
| 2005/0039959 A1* | 2/2005 | Fruhauf et al. | 180/65.3 |
| 2005/0092479 A1 | 5/2005 | Umeo et al. | |
| 2005/0204768 A1* | 9/2005 | Di Vito et al. | 62/324.1 |
| 2006/0218952 A1* | 10/2006 | Nagae et al. | 62/216 |
| 2006/0248906 A1* | 11/2006 | Burk et al. | 62/160 |
| 2007/0151270 A1* | 7/2007 | Matsunaga et al. | 62/216 |
| 2007/0251265 A1* | 11/2007 | Kurata et al. | 62/513 |
| 2011/0174000 A1* | 7/2011 | Richter et al. | 62/93 |

FOREIGN PATENT DOCUMENTS

| | | |
|---|---|---|
| DE | 19930148 A1 | 1/2000 |
| DE | 10201741 A1 | 8/2003 |
| DE | 102009048674 A1 | 5/2010 |
| WO | 03074305 A2 | 9/2003 |

\* cited by examiner

REFRIGERANT CIRCUIT OF AN HVAC SYSTEM OF A MOTOR VEHICLE

CROSS-REFERENCE TO RELATED APPLICATION

The present application claims priority to German Patent Application Serial No. DE 10 2010 042 127.8 filed Oct. 7, 2010, the entire disclosure of which is hereby incorporated herein by reference.

FIELD OF INVENTION

The invention relates to a refrigerant circuit of an HVAC system of a motor vehicle, particularly an electric or hybrid vehicle, the refrigerant circuit configured to utilize several heat sources and several heat sinks. Further, the invention relates to a process for operating the refrigerant circuit.

BACKGROUND OF THE INVENTION

The trend towards high-efficiency, environment-friendly drive systems for motor vehicles means that sufficient waste heat for heating the vehicle interior is no longer available. Compared to vehicle engines, particularly, the drive train of an electric vehicle works much more efficiently. Due to less waste heat and the lower temperature level of the refrigerant circuit that cools the drive train, the comfort conditions worsen in vehicles with the heating of the vehicle interior exclusively based on the engine refrigerant circuit. To meet familiar comfort demands requires additional measures. Therefore, efforts are made to heat the interior of an electric vehicle using, for example, an electric resistance heating system based on the use of so-called high-voltage PTC or low-voltage PTC (PTC—positive temperature coefficient). But the additional electric heating has effects on the efficiency of the electric vehicle, particularly the HVAC system. The range of the vehicle is dramatically reduced.

In prior art, it is known to utilize for heating the vehicle interior, apart from the above mentioned additional heating systems, the refrigerant systems, or refrigerating plants, respectively, present in the motor vehicles. This can be realized, for example, by that for heating, the refrigerating plant is operated as heat pump.

Alternatively, a short circuit without secondary heat pickup can be used. Here, the mechanical driving power of the compressor is to a large extent transformed into heat for heating the vehicle interior.

Upon operation, the battery cells of the battery, as well as other components of the electric drive train such as the electric motor and the power electronics, heat up. Particularly, during decharging and charging, the battery should be operated at the optimal temperature. The developed and released heat is to be dissipated, because an increased temperature of operation causes a very high thermal load of the battery cells. Because of the limited temperature stability of the batteries, they have to be actively cooled. The ambient air, air of the vehicle interior, refrigerant, and coolant are suitable mediums to cool the battery and other electronic components of the drive train that also have to be protected from too high thermal loads, therefore to be thermally conditioned. For example, water or glycol, respectively, are used as coolant. Thermal conditioning of the battery and other components of the electric drive train is necessary both during travel as a dynamic operation and at a rest as a stationary operation of the vehicle.

Cooling the battery, which for a refrigerant circuit is to be considered to be a heat source, results in an increased life and should be performed such that the temperatures of the cooled battery only vary within a limited range. For an operation at an optimal operating temperature of the batteries of the electric vehicles, not only the developed heat is to be dissipated but also, at a too low ambient temperature, heat is to be supplied to the cold battery, especially during starting.

From prior art, HVAC systems of electric vehicles are known that first, serve to temper the components of the electric drive train and second, transfer absorbed heat to the air supplied into the vehicle interior.

DE 199 30 148 A1 discloses a system for the temperature control of the interior of a motor vehicle driven by an electric motor, with the energy provided to the system by so-called high-temperature batteries. A refrigerant circuit comprises a primary circuit with an external and an internal heat exchanger, wherein the internal heat exchanger is arranged in the path of a first air mass flow that is oriented in the direction of the interior. Further, the refrigerant circuit is provided with a secondary circuit with a compressor and a switching device for the direction of circulation of the refrigerant in the primary circuit. Thus, the system is operatable in a heating or cooling mode for the interior. A water cooling circuit making possible the cooling of batteries includes a liquid/air heat exchanger in the path of the first air mass flow and a liquid/refrigerant heat exchanger in the secondary circuit of the refrigerant circuit. The refrigerant circuit, in each case, has a heat source and a heat sink. If the refrigerant circuit is directly thermally connected to the water cooling circuit, the refrigerant circuit comprises an additional heat exchanger as a further heat source.

In DE 102 01 741 A1, a process for the tempering of a vehicle as well as an HVAC system and a heat source within the vehicle are provided, both supplied over a medium circuit with a common medium for cooling and/or heating. The medium circuit is provided with means for expanding and compressing the medium. Cooling of the heat source and air conditioning of the vehicle are realized by one medium. In addition to the heat source, the HVAC system includes heat exchangers that dependent on the demand can be operated as heat sources and/or heat sinks.

In both the system disclosed by DE 199 30 148 A1 and the HVAC system described in DE 102 01 741 A1, the heating function for the vehicle interior is realized over a heat exchanger that in cooling mode of the plant is switched as an evaporator. When this heat exchanger is afterwards used for heating again, a highly undesirable effect dangerous in relation to safety arises.

Particularly while the refrigeration system is being used as refrigeration plant, that is in a cooling mode, the evaporator placed in the ventilation system of the vehicle will dehumidify the air to be cooled. The humidity condensed on the evaporator surface is then, after a standstill of the vehicle and when started again with the heat exchanger that previously was operated as evaporator, used in heating mode as a condensor due to heating delivered to the air flow to be supplied into the interior. Such an alternating use of the refrigerant circuit as a refrigeration plant or a heat pump is more frequent in the transitional period.

The high humidity content in the air supplied to the vehicle interior causes precipitation at the cold surfaces in the vehicle interior, particularly, fogging of the window glasses with accompanying worsening of the passengers' vision. This effect is known as flash fogging.

A further developed system is, for example, disclosed by DE 10 2009 048 674 A1, wherein an HVAC system for a motor vehicle, particularly an electric vehicle or hybrid vehicle, with a refrigerant circuit is described that comprises an evaporator and a heat exchanger. The heat exchanger enables heat energy that is supplied into the refrigerant circuit to be fed into the fresh air of a passenger compartment. The HVAC system further is provided with an exhaust air line through which the air can be exhausted from the passenger compartment. The evaporator of the refrigerant circuit is in at least a partial area located in the interior of the exhaust air line. Therefore, the heat energy of the exhaust air is transferable into the fresh air in a heat pump mode of the HVAC system. Thus, the HVAC system is provided with components for heat recovery. The heat dissipated from the exhaust air is transferred into the fresh air by means of an intermediate medium and hence, additional heat exchangers.

SUMMARY OF THE INVENTION

The invention aims at providing an HVAC system for the interior of a vehicle, particularly an electric or hybrid vehicle, with the additional possibility to condition components of the electric drive train, the HVAC system demanding minimum electric power for operation, thus providing a greatest possible electric power for a maximum range of the vehicle. Further, using several heat sources and heat sinks, the system is intended to be efficiently operatable and designed compact in order to minimize the space required within the vehicle. In this way, it is intended to minimize the operating costs, the costs of manufacture, and the servicing costs. In addition, it is intended to avoid negative safety effects during operation of the system.

According to the invention, the problem is solved by a refrigerant circuit of an HVAC system for a vehicle, particularly an electric vehicle or hybrid vehicle. The refrigerant circuit comprises a primary circuit and a secondary train.

The primary circuit with a compressor, a heat exchanger for heat transmission between the refrigerant and the environment, a collector, an expansion member, and a second heat exchanger for supplying heat from the fresh air to be conditioned of the vehicle interior to the refrigerant is provided with components of a traditional refrigerant circuit of an HVAC system. Also, the primary circuit is provided with a further heat exchanger that is arranged switched parallel to the heat exchanger provided for supplying heat from the fresh air to be conditioned to the refrigerant. The heat exchanger for heat transmission between the refrigerant and the environment is preferentially established bidirectionally passable.

The secondary train extends starting from a tapping point positioned between the compressor and the heat exchanger of the primary circuit, the heat exchanger provided for heat transmission between the refrigerant and the environment, up to a connection point. The connection point is placed between the heat exchanger for heat transmission between the refrigerant and the environment and the heat exchanger for heat absorption of the refrigerant from the fresh air to be conditioned of the vehicle interior. The secondary train is provided with a heat exchanger for heat transmission from the refrigerant to the air to be conditioned of the vehicle interior and a subsequent control valve.

The arrangement according to the invention of the components within the refrigerant circuit enables for conditioning the fresh air to be fed into the vehicle interior switching over between a heating mode and a cooling mode and, further, an advantageous reheating mode of the refrigerant circuit of the HVAC system.

In an advantageous embodiment of the invention, the connection point is placed in the high pressure region of the refrigerant circuit and, established as a collector, in addition to storing the refrigerant dependent on the operational mode of the refrigerant circuit, serves also to bring together and/or divide partial mass flows of the refrigerant. For that the collector is provided with different refrigerant lines that enter the volume enclosed by the collector. The refrigerant flows from various refrigerant lines into the collector and/or leaves the collector again.

With the positioning of the heat exchanger for heat transmission between a component of the drive train and the refrigerant, the refrigerant circuit is preferentially configured for an additional combined cooling operation and heating operation of the component of the drive train of the vehicle. The heat exchanger is passable bidirectionally and is provided with a member in cooling mode switched upstream in the direction of flow of the refrigerant. The upstream switched member is advantageously established adjustable in cooling mode of the heat exchanger as expansion member and in heating mode of the heat exchanger as member with pressure maintaining passage of the refrigerant. As expansion member, an expansion valve is preferentially provided, established externally controllable.

According to an embodiment of the invention, the primary circuit is provided with entering points. Between the entering points, an expansion member is positioned that is typically configured as expansion valve, with the expansion valve also advantageously established externally controllable.

The heat exchanger of the primary circuit, which corresponds to the heat exchanger for the direct heat transmission between the refrigerant and the environment, is established as a condenser or an evaporator dependent on the operational mode of the refrigerant circuit. The heat exchanger of the primary circuit, which corresponds to the heat exchanger for the direct heat supply from the fresh air to be conditioned of the vehicle interior to the refrigerant, is provided as an evaporator and thus, for the cooling and/or dehumidification of the fresh air. The heat exchanger of the secondary train serves with direct heat transmission as a condenser for heating and reheating of the cooled fresh air to be conditioned that is supplied to the vehicle interior.

The heat exchanger, established preferentially passable bidirectionally, for heat transmission of a component of the drive train over the refrigerant is dependent on the operational mode of the refrigerant circuit provided as a condenser or an evaporator for heating or for cooling of the battery of the vehicle. An additional heat exchanger, switched parallel to this heat exchanger established preferably passable bidirectionally, is provided as an evaporator for cooling of further components of the electric drive train of the vehicle.

Alternatively, the heat exchangers of the primary circuit established for heat transmission over components of the drive train, can also be integrated into coolant circuits so that the heat transmission between the refrigerant and a coolant takes place in intermediate circuits or, dependent on the configuration, in a common intermediate circuit.

A further embodiment of the invention consists in that within the secondary train that starting from the tapping point located subsequent to the compressor in the direction of flow of the refrigerant extends up to the connection point of the primary circuit that is preferentially established as collector, a switching valve is placed between the tapping point and the downstream heat exchanger. Also, the primary circuit is provided with a switching valve that is displaced between the bidirectionally passable heat exchanger for heat transmission of a component of the drive train over the refrigerant and an entering point. The switching valves provided within the secondary circuit and the primary circuit advantageously form a refrigerant connection from the secondary train to the primary circuit, particularly from the secondary train to the bidirectionally passable heat exchanger of the drive train.

Further, it is advantageous to configure the primary circuit provided with an internal heat exchanger, wherein the internal heat exchanger is positioned on the high pressure side in the direction of flow of the refrigerant subsequent to the connection point preferentially established as collector, on the low pressure side in the direction of flow of the refrigerant previous to the compressor. Therefore, it is possible to transmit heat between the liquid refrigerant at high pressure and the gaseous refrigerant at low pressure within the primary circuit, that is internal to the refrigerant circuit. Hereby liquid refrigerant is overcooled after condensation, or at the outflow of the collector, respectively, and at the same time the suction gas drawn in by the compressor is overheated.

In the process according to the invention for operating the refrigerant circuit for a combined cooling mode and heating mode and for the reheating mode in relation to the fresh air to be conditioned for the vehicle interior, in cooling mode the primary circuit and in heating mode and in reheating mode as well both the primary circuit and the secondary circuit are passed by refrigerant. Accordingly, a heat exchanger in cooling mode and reheating mode established as condenser, serving to transmit heat between the refrigerant and the environment, and a valve in relation to the heating mode are passed by the refrigerant in the opposite direction.

Also, at a connection point placed in the high pressure region of the refrigerant circuit, the connection point preferentially established as collector, the refrigerant, divided into partial mass flows dependent on the operational mode, is brought together and/or divided. The refrigerant inflows through various refrigerant lines entering the collector and/or outflows again. Hereby individual refrigerant lines are passed in opposite directions dependent on the operational mode.

According to an advantageous embodiment of the invention, the process is provided for a combined cooling operation and heating operation in relation to a component of the drive train of the vehicle, with a heat exchanger that in cooling mode is established as an evaporator and a valve in relation to the heating mode being passed by the refrigerant in the opposite direction.

Advantageously, the refrigerant circuit is operated such that the fresh air to be conditioned for the vehicle interior, the ambient air, the battery, and components of the drive train such as the electric motor and the power electronics are optionally or simultaneously used as heat sources. Also, dependent on the operational mode of the refrigerant circuit, the ambient air, the fresh air, and the battery are optionally or simultaneously used as heat sinks.

According to a first embodiment of the process of the invention, the refrigerant circuit is operated in heating mode for the fresh air to be conditioned for the vehicle interior.

A heat exchanger for heat transmission with the environment, a heat exchanger for heat transmission over the fresh air to be conditioned for the vehicle interior, and a heat exchanger for heat transmission with components of the electric drive train and the refrigerant each are operated as an evaporator. Upon evaporation, the refrigerant always absorbs heat. So the ambient air, the fresh air, and components of the electric drive train optionally or simultaneously serve as heat sources.

At the same time, a heat exchanger is operated as a condenser for heat transmission over the refrigerant. Upon condensation, the refrigerant releases heat to the fresh air to be conditioned for the vehicle interior so that the fresh air is a heat sink. Accordingly, the fresh air is heated. The necessary heat is transmitted from the heat sources to the refrigerant circuit.

According to a second embodiment of the process of the invention, the refrigerant circuit is operated in reheating mode for the fresh air to be conditioned for the vehicle interior.

Here, a first heat exchanger for heat transmission between the fresh air to the vehicle interior and the refrigerant, or a heat exchanger for heat transmission from components of the electric drive train and the refrigerant, respectively, is operated as an evaporator so that the refrigerant optionally or simultaneously uses the fresh air and components of the electric drive train as heat sources and absorbs heat in each case.

At the same time, the heat exchanger for heat transmission between the ambient air and the refrigerant, or a second heat exchanger for heat transmission between the fresh air and the refrigerant, respectively, is operated as a condenser and heat is delivered to the ambient air, or the fresh air, respectively, as heat sinks.

According to a third embodiment of the process of the invention, the refrigerant circuit is operated in cooling mode for the fresh air to be conditioned for the vehicle interior. Compared to the operation in reheating mode, here, the second heat exchanger for heat transmission between the fresh air and the refrigerant is not passed by refrigerant and hydraulically separated from the refrigerant circuit.

According to a fourth embodiment of the process of the invention, the refrigerant circuit is operated in heating mode for heating of a component of the electric drive train, preferably the battery.

The heat exchangers for heat transmission between the ambient air, the fresh air, and a component of the electric drive train are operated with the refrigerant as an evaporator so that the refrigerant absorbs heat in each case and the ambient air, the fresh air, and components of the electric drive train are used optionally or simultaneously as heat sources.

At the same time, the heat exchangers for heat transmission between the battery and the fresh air are operated with the refrigerant as a condenser so that the refrigerant delivers heat in each case and the component of the electric drive train and the fresh air are used optionally or simultaneously as heat sinks.

The heat exchangers for heat transmission with the ambient air, the fresh air to be conditioned for the vehicle interior, and the components of the electric drive train and the refrigerant are advantageously operated with direct heat transmission so that the processes of heat delivery from the refrigerant to the heat sinks and the processes of heat absorption from the refrigerant to the heat sinks take place directly with the refrigerant. Thus, the process according to the invention of the refrigerant circuit is preferentially operated without intermediate circuits such as coolant circuits.

According to an alternative embodiment of the invention, particularly the heat exchangers for heat transmission between components of the electric drive train and the refrigerant are operated over intermediate circuits and, thus, indirect heat transmission.

A special advantage of the process according to the invention is the use of various heat sources with at least three different pressure levels, or temperature levels, respectively, by use of a multi-stage expansion within the refrigerant circuit. The refrigerant is compressed by the compressor from low pressure to high pressure. With the multi-stage expansion, the refrigerant is in a first expansion stage decompressed to an intermediate pressure level, also known as mean pressure. In the second expansion stage the refrigerant is decompressed from mean pressure to low pressure.

Hereby, first, the partial mass flows of the refrigerant that absorb the heat from the heat sources at a higher temperature level are brought together at a first entering point. Second, the partial mass flows of the refrigerant that absorb the heat from heat sources at a lower temperature level are united at a second entering point. The second entering point is positioned in the direction of flow of the refrigerant after the first entering point. The refrigerant is advantageously decompressed when passing an expansion member placed between the entering points. The expansion member established as expansion valve is preferentially controlled externally.

The solution according to the invention has various advantages: conditioning, particularly cooling, dehumidifying and/or heating of the vehicle interior at minimum effort of electric energy, with use of waste heat flows for heating the vehicle interior, cooling of the components of the drive train of the vehicle, such as the battery, the electric motor and the power electronics, resulting in increased performance, efficiency, and life of the components, providing of a comfort in the passenger compartment at the same level known of engine-driven vehicles, ensuring the maximum range of electric vehicles with same battery capacity, particularly under extreme climatic conditions, also by reduction of the required battery capacity for auxiliaries, accompanied with reduction of weight, cost reduction, and saving of limited resources such as lithium.

BRIEF DESCRIPTION OF THE DRAWINGS

Further details, features and advantages of the invention will become apparent from the following detailed description of examples of embodiment in connection with the accompanying drawings. The figures each show a refrigerant circuit.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
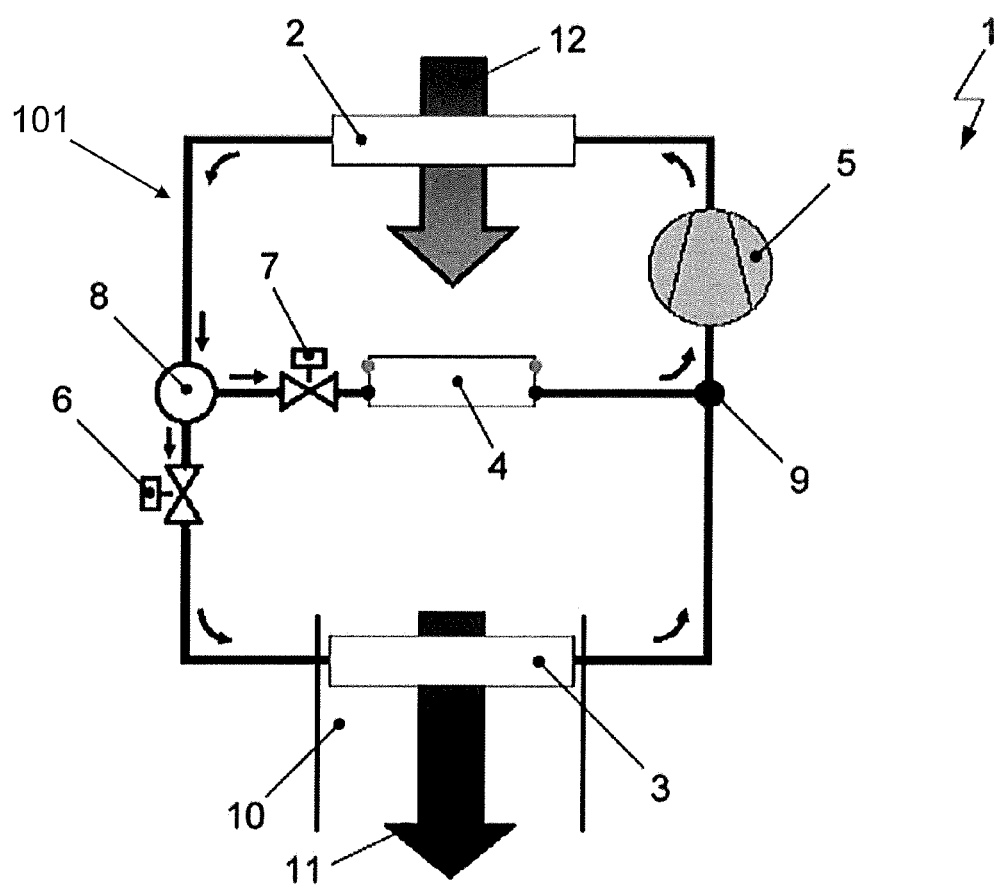
FIG. 1: with two heat sources and a heat sink for the ventilation of the vehicle interior while cooling and dehumidifying the fresh air, and for the cooling of the battery.

FIG. 1 shows a refrigerant circuit 1 as primary circuit 101 with, in the direction of flow of the refrigerant, a compressor 5, a condenser 2 for direct heat transmission from the refrigerant to the ambient air 12, a collector 8, a first expansion valve 6 and an evaporator 3 for directly supplying heat from the fresh air to be conditioned for the vehicle interior to the refrigerant. In the direction of flow of the refrigerant between the connection point 8 established as collector 8 and an entering point 9 a further evaporator 4 with upstream expansion valve 7 is arranged. The evaporators 3, 4 are switched parallel to each other. The entering point 9 is established as T-piece 9 and may also be referred to as a first entering point 9. The connection point 8 established as collector 8 is placed in the high pressure region of the refrigerant circuit 1 so that the collector 8 is equivalent to a high pressure collector 8. The condenser 2 may also be referred to as the first heat exchanger 2, the evaporator 3 may also be referred to as the second heat exchanger 3, and the evaporator 4 may be referred to as the third heat exchanger 4.

In a first alternative embodiment of the refrigerant circuit 1, additionally, a collector (not-shown) is provided in the low pressure region so that the refrigerant circuit is configured to be provided with both a low pressure collector and a high pressure collector 8. In a second alternative embodiment, the refrigerant circuit 1, apart from the high pressure collector 8, is established with a collector (not-shown) arranged at an intermediate pressure level. Hereby, it is possible to provide the arrangement of the collector at intermediate pressure level instead of the low pressure collector or combined with a low pressure collector.

The refrigerant compressed in the compressor 5, thereby heated, delivers heat to the ambient air 12 in the condenser 2, thereby liquefied. So the condenser 2 serves as heat sink of the refrigerant circuit.

After leaving the condenser 2, the liquid refrigerant is stored in the collector 8. Due to the decompression when passing through the expansion valves 6, 7, the refrigerant is led as two-phase mixture to the evaporators 3, 4 and evaporated there absorbing heat. The gaseous refrigerant is drawn in by the compressor 5. The refrigerant circuit 1 is closed.

The two evaporators 3, 4 each are a heat source, operated optionally or simultaneously. The evaporator 3 placed in the air channel 10 serves to cool and dehumidify the fresh air 11 for ventilating the vehicle interior, whereas the evaporator 4 is provided for cooling the battery of the vehicle. Tempering of the battery is ensured through direct heat transmission by the refrigerant. Alternatively, the heat exchanger 4 can also be integrated into a coolant circuit of the battery cooling. The evaporator 4 of the battery cooling is also referred to as chiller 4.

Hence, in FIG. 1 the refrigerant circuit 1 is shown in cooling mode of the HVAC system of the vehicle in relation to the fresh air 11 supplied to the vehicle interior.

Figure 2:
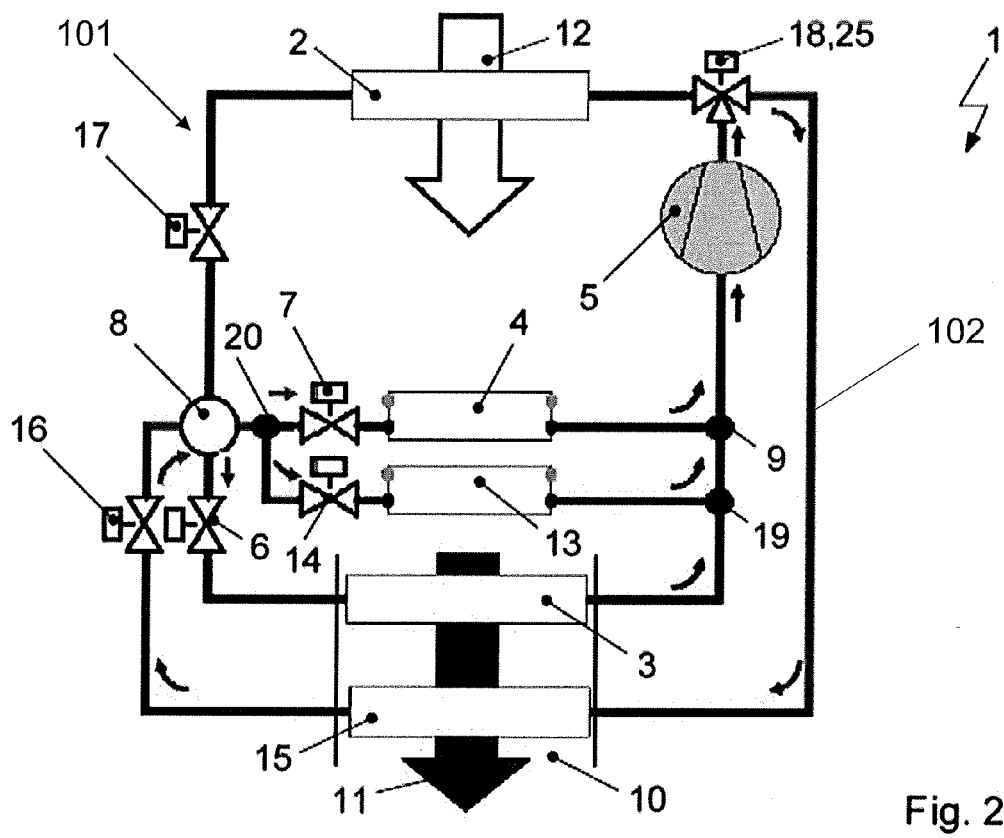
FIG. 2: with the operation of three heat sources and a heat sink for the ventilation of the vehicle interior while dehumidifying/cooling and heating the fresh air, and for the cooling of the battery and components of the drive train.

In FIG. 2, the refrigerant circuit 1 to FIG. 1 illustrating the primary circuit 101 is shown with further heat exchangers 13, 15 as heat sources and heat sinks It should be understood that hereinafter reference to the primary circuit 101 refers to those components illustrated in FIG. 1 as each subsequent figure contains the same components in the same orientation. Additionally, the heat exchanger 15 may also be referred to as a fourth heat exchanger 15 and the heat exchanger 13 may also be referred to as a fifth heat exchanger 13. Here, in addition to the evaporator 4 of the battery cooling, an additional evaporator 13 with upstream expansion valve 14 as heat source is switched in parallel, provided for the cooling of other components of the electric drive train. In this way, the number of heat exchangers can be increased freely. The evaporator 13, also known as chiller 13, is integrated over a T-piece 20 in the refrigerant line between the collector 8 and the expansion valve 7, and over a T-piece 19 in the refrigerant line between the evaporator 3 and the T-piece 9. The mass flow of the refrigerant is divided into partial mass flows. Tempering of the components of the electric drive train is also ensured through direct heat transmission by the refrigerant. Alternatively, the heat exchanger 13 can also be established integrated into a coolant circuit of the components of the electric drive train. So, the waste heat of the components of the electric drive train is coupled into the refrigerant circuit 1 over the heat exchanger 13 also established as chiller 13 by means of a coolant based cooling system as heat carrier.

Because of possibly different temperature levels of the electric drive components, such as the electric motor, power electronics, and battery, two or more different, possibly independent coolant circuits can be provided, which then are integrated into the refrigerant circuit 1 either by means of a common or by means of two or several, respectively, single chillers 4, 13. In the case of the refrigerant circuit 1 configured with several chillers 4, 13, the chillers 4, 13 can be arranged either in series, preferentially according to increasing order of the temperature levels of the coolant, or in parallel in the refrigerant circuit 1.

When the refrigerant circuit 1 is configured to be arranged parallel, each chiller 4, 13 is advantageously provided with a block able expansion member 7, 14. The expansion member 7, 14 can be established as expansion valve, but preferentially as an externally controllable expansion member such as provided with a stepping motor or as solenoid-actuated proportional valve.

In addition to the primary circuit 101, the refrigerant circuit 1 is provided with a secondary train 102. The secondary train 102 extends starting from a tapping point 25 placed between the compressor 5 and the heat exchanger 2 up to the connection point 8 established as collector 8. The tapping point 25 is established as three-way valve, or switching valve 18, respectively. A heat exchanger 15 is located in the secondary train 102 as a second condenser 15 for the direct heat transmission from the refrigerant to the air to be conditioned of the vehicle interior, and a subsequent control valve 16. The heat transmission surfaces of the condenser 15, provided in the air channel 10 of the HVAC system in the direction of flow of the fresh air 11 downstream of the evaporator 3, are like the evaporator 3 directly passed over by the fresh air 11. The fresh air 11 dehumidified and cooled in the evaporator 3 is reheated when passing over the condenser 15, then directed into the passenger compartment.

In this case, the heat of the refrigerant that is compressed in the compressor 5 is not transferred to the ambient air 12 in the condenser 2. On the contrary, the hot refrigerant is passed over the switching valve 18 to the heat exchanger 15 and condensed there. The condenser 15 serves as heat sink for the refrigerant circuit. After having been liquefied in the condenser 15, the refrigerant flows through the opened control valve 16 into the collector 8. The condenser 2 for heat transmission over the ambient air 12 is hydraulically separated from the refrigerant circuit 1 over the switching valve 18 and the valve 17. The valve 17 is switched as blocking valve 17.

Thus, in FIG. 2 the refrigerant circuit 1 is shown in heating mode of the HVAC system of the vehicle in relation to the fresh air 11 into the vehicle interior. The three evaporators 3, 4, 13 each optionally or simultaneously are operated as heat source. The waste heat of the battery, the waste heat of the electric drive train, and/or the fresh air 11 are used as heat sources. When operated simultaneously, the mass flow of the refrigerant is divided into partial mass flows through the evaporators 3, 4, 13.

Figure 3:
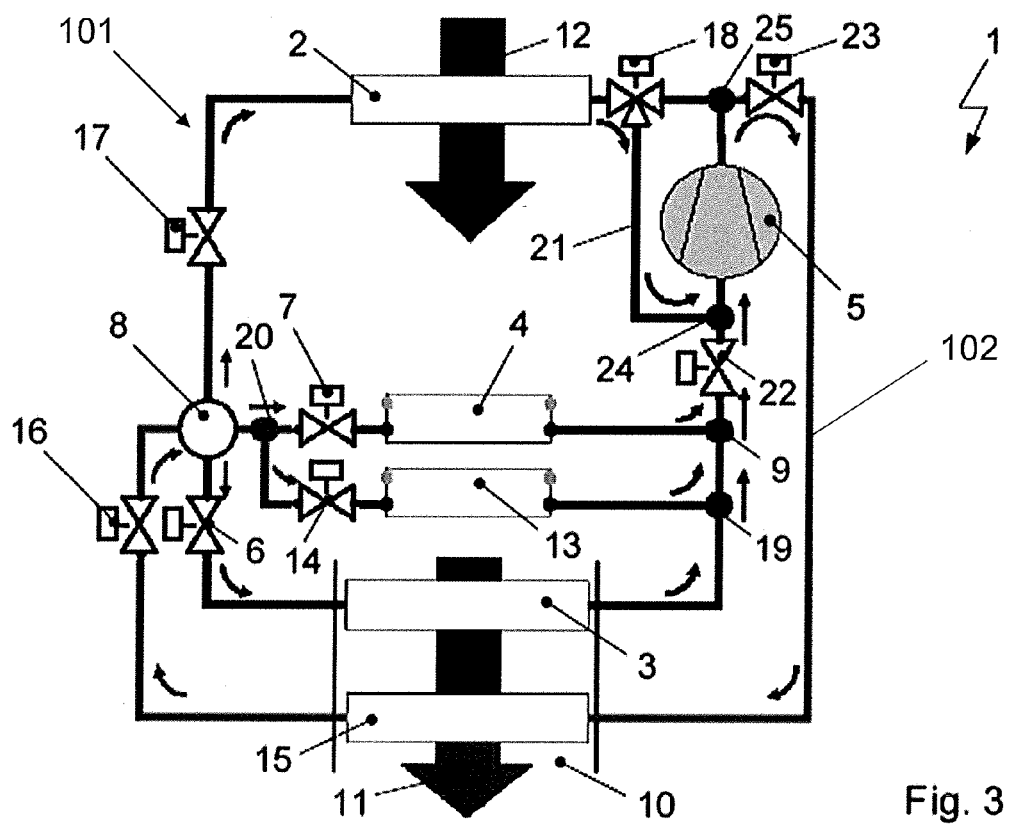
FIG. 3: established similar to FIG. 2 with heat transmission over the ambient air as additional heat source.

FIG. 3 shows an extended refrigerant circuit 1 of FIG. 2 including the primary circuit 101 and the secondary train 102 with the ambient air 12 integrated as additional heat source. The valve 17 is used as expansion valve 17. The refrigerant compressed in the compressor 5 is led over the tapping point 25 to the switching valve 18 that is established separate from the tapping point 25. The tapping point 25 established as T-piece 25 divides the refrigerant line into two trains, first, the secondary train provided with an additional blocking valve 23 in the direction of flow of the refrigerant after the T-piece 25, and second, a connection train to the heat exchanger 2. The switching valve 18 is placed within the connection train to the heat exchanger 2 and as three-way valve forms an additional connection line 21 of the refrigerant for the entry into the compressor 5. The additional connection line 21 branches off over the switching valve 18 from the connection train, which enters the refrigerant line into the compressor 5 over an entering point 24, which may also be referred to as the second entering point 24. Compared to the refrigerant circuit 1 of FIG. 2 between the T-piece 9 and the entering point 24 also established as T-piece 24, advantageously, a further expansion member 22 in form of an expansion valve 22 is located.

Over the expansion valve 17, in which a partial mass flow of the refrigerant after leaving the collector 8 is decompressed to a lower pressure level, the two-phase refrigerant flows to the heat exchanger 2 at a temperature below the temperature of the ambient air 12. In the heat exchanger 2, which is operated in cooling mode to FIG. 1 as condenser 2, the refrigerant is now evaporated. The ambient air 12 directly flows over the heat transmission surfaces of the evaporator 2 so that the heat of the ambient air 12 is transferred to the refrigerant. Then the refrigerant flows through the switching valve 18 and the connection line 21 and the T-piece 24 to the entry of the compressor 5.

The refrigerant evaporated in the evaporators 3, 4, 13, possibly having a higher pressure level and temperature level than the partial mass flow of the refrigerant, that passed the evaporator 2, is when passing the expansion valve 22 decompressed to the pressure level of the refrigerant that was directed through the evaporator 2. The refrigerant now as total mass flow drawn in by the compressor 5 is directed in compressed state through the opened blocking valve 23 into the secondary train and, as described for FIG. 2, will pass the refrigerant circuit 1.

Thus, the refrigerant circuit 1 carries out a three-stage expansion so that different pressure levels, or different temperature levels, respectively, of the heat sources integrated into the refrigerant circuit 1 are usable.

Like in FIG. 2, also in the circuitry to FIG. 3 the refrigerant circuit 1 is operated in heating mode of the HVAC system of the vehicle in relation to the fresh air 11 to the vehicle interior. The four evaporators 2, 3, 4, 13 each are optionally or simultaneously operated as heat sources dependent on the demand. The ambient air, the waste heat of the battery, the waste heat of the electric drive train and/or the fresh air 11 are used as heat sources. The mass flow of the refrigerant is then divided into partial mass flows through the evaporators 2, 3, 4, 13.

Figure 4A:
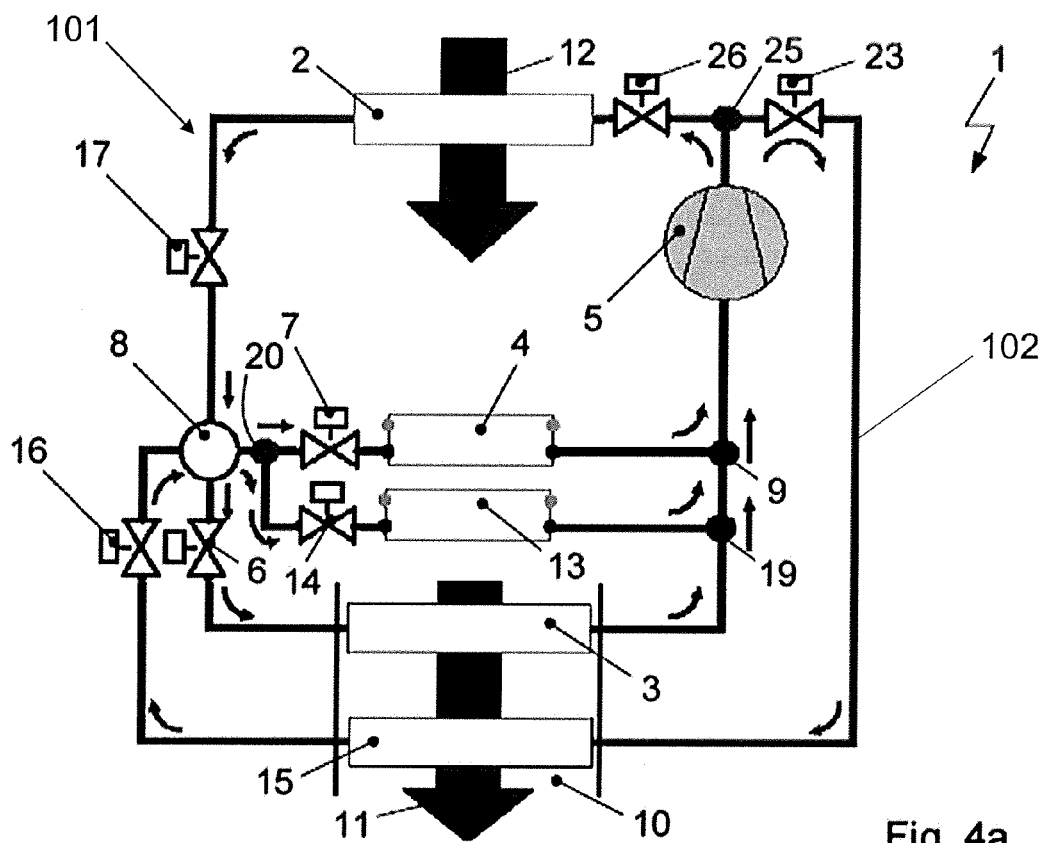
FIG. 4a, 4b: established similar to FIG. 2 or FIG. 3, respectively, with heat transmission over the ambient air as additionally operated heat sink for the ventilation of the vehicle interior while cooling, dehumidifying and reheating the fresh air, and for the cooling of the battery and components of the drive train.
Figure 4B:
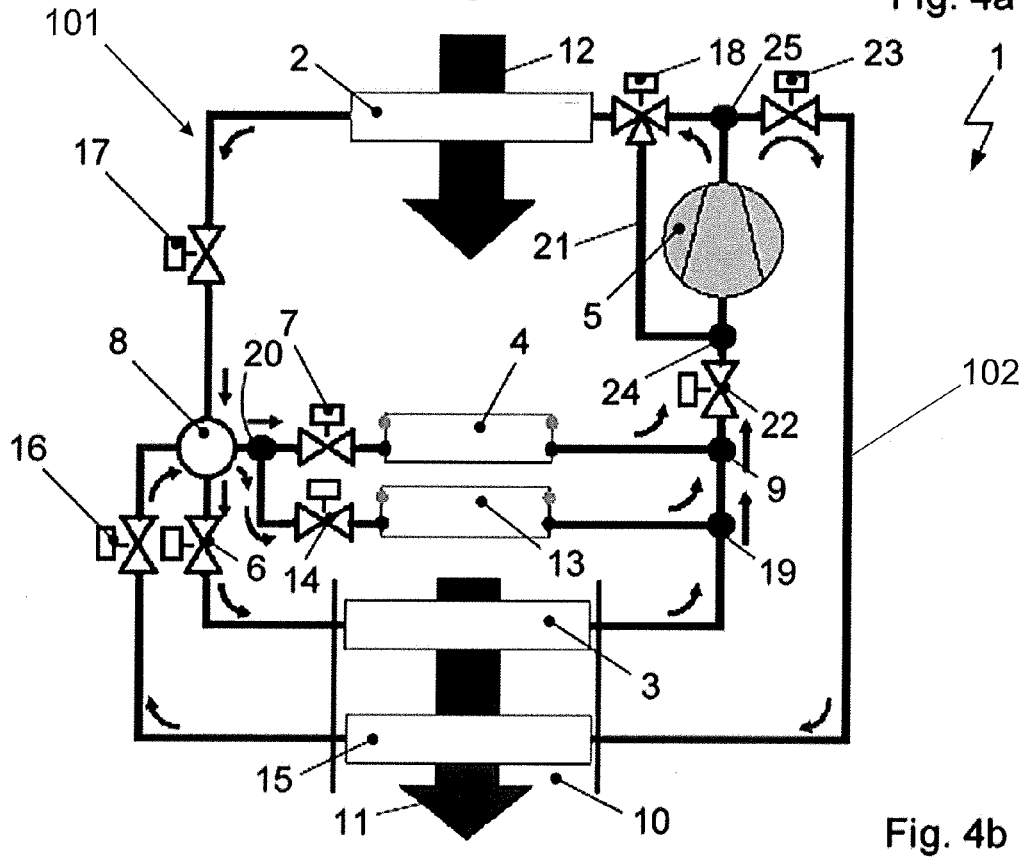

FIG. 4a shows the refrigerant circuit 1 including the primary circuit 101 and the secondary train 102 in a configuration slightly changed compared to the refrigerant circuit 1 of FIG. 2. In FIG. 4b, the refrigerant circuit 1 including the primary circuit 101 and the secondary train 102 is shown slightly modified compared to the refrigerant circuit 1 of FIG. 3. The refrigerant circuit 1 for the conditioning of the vehicle interior while simultaneously cooling, dehumidifying, and reheating the fresh air 11 and for cooling of the battery and other components of the drive train of the vehicle includes an additional heat sink with the heat transmission over the ambient air 12.

Thus, the configuration of the refrigerant circuit 1 makes possible to operate the HVAC system in a combined cooling and heating mode, also known as refrigeration plant mode and heat pump mode, and a reheating mode for heating, cooling, and dehumidifying the air to be conditioned of the vehicle interior.

In comparison to the refrigerant circuit 1 of FIG. 2, the refrigerant circuit 1 of FIG. 4a, instead of the three-way valve, or switching valve 18, respectively, is provided with a tapping point 25 established as T-piece 25 with blocking valves 23, 26 positioned downstream in the direction of flow of the refrigerant. The blocking valve 23 is a component of the secondary train. The blocking valve 26 is placed in the refrigerant line between the tapping point 25 and the heat exchanger 2. The control valve 17 is opened.

In comparison to the refrigerant circuit 1 of FIG. 3, the refrigerant circuit 1 of FIG. 4b is provided with the same circuit components. The valves 17, 22, however, are opened and do not serve as expansion valves. Also, the switching valve 18 is switched such that the refrigerant compressed by the compressor 5 is directed to the heat exchanger 2 with the connection line 21 closed.

By means of the placement of the T-piece 25 and the subsequent blocking valves 23, 26 instead of the switching valve 18 of FIG. 4a and the shown switching of the valves 17, 18, 22 to FIG. 4b, it is possible to use the heat exchanger 2 as additional heat sink, that is as condenser 2. The mass flow of the refrigerant compressed in the compressor 5 is divided into a partial mass flow through the secondary train, hence the condenser 15, and a partial mass flow through the condenser 2.

This enables the fresh air 11, cooled and dehumidified in the evaporator 3, to be reheated. The heat absorbed by the refrigerant in the evaporators 3, 4, 13 is transferred to the fresh air 11 by means of the condenser 15 so that the cooled and dehumidified fresh air 11 is heated up. In reheating mode, the expansion valve 6 and the blocking valve 23 are controlled such that the heating power at the condenser 15 of the secondary train can be lower than the sum of the cooling powers absorbed in the evaporators 3, 4, 13, particularly the cooling power required for cooling and dehumidifying the fresh air 11. Excess heat is dissipated over the condenser 2 to the ambient air 12.

Thus, to the FIGS. 4a and 4b, the refrigerant circuit 1 is operated in reheating mode of the HVAC system of the vehicle in relation to the fresh air 11 to the vehicle interior. Again the three evaporators 3, 4, 13 each are optionally or simultaneously operated as heat source dependent on the demand, with the mass flow of the refrigerant possibly divided to partial mass flows through the evaporators 3, 4, 13. The two condensers 2, 15 each are used as heat sink. The ambient air 12 and the fresh air 11 serve as heat sinks.

Figure 5A:
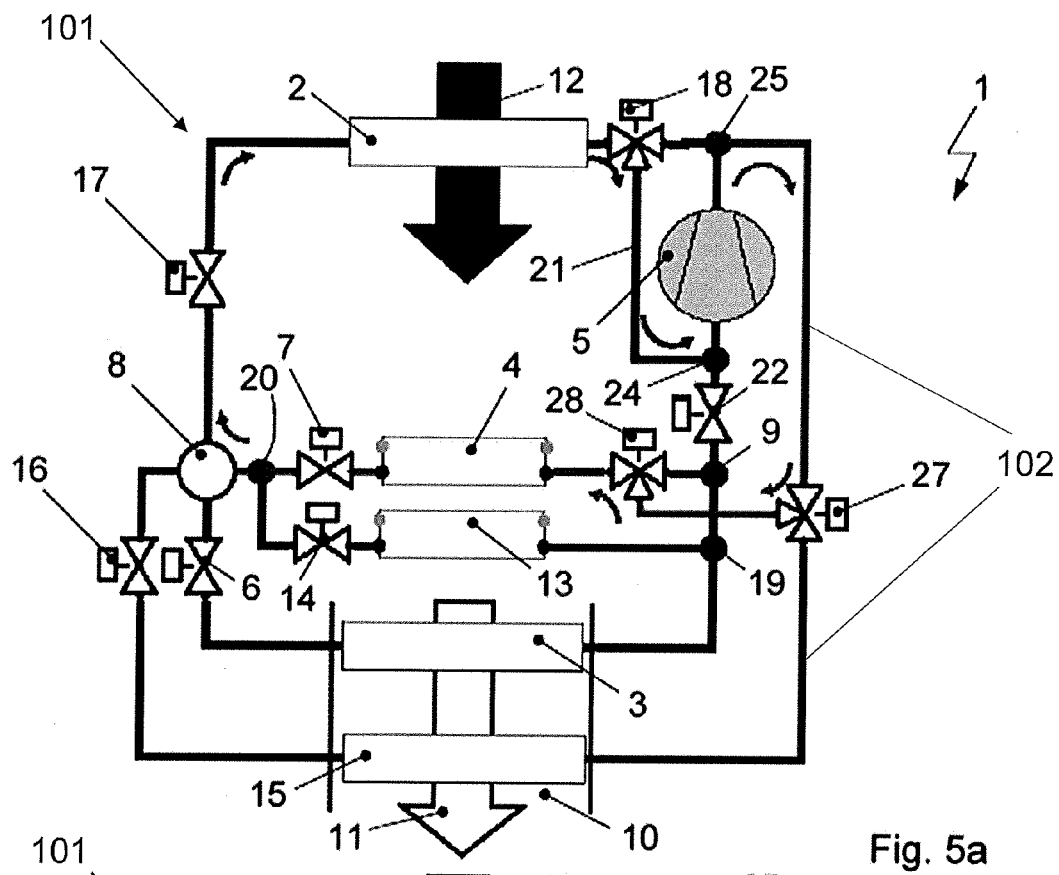
FIG. 5a, 5b: established similar to FIG. 3 with the operation from a heat source, ambient air, and a heat sink for the heating of the battery.
Figure 5B:
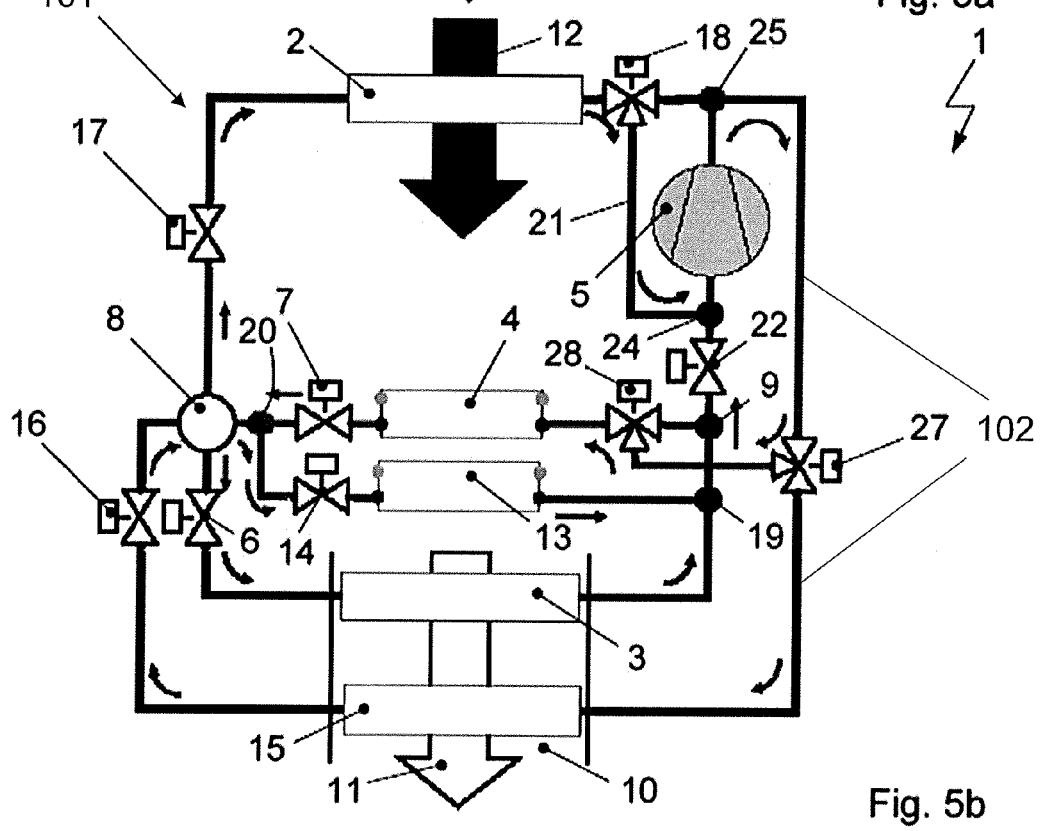

In the FIGS. 5a and 5b an extension of the refrigerant circuit 1 to FIG. 3 is shown including the primary circuit 101 and the secondary train 102 with the ambient air 12 serving as heat source for heating the battery.

As distinct from the refrigerant circuit 1 to FIG. 3, the blocking valve 23 within the secondary train is not shown. As additional components switching valves 27, 28, first, are integrated in the secondary train and, second, between the heat exchanger 4, which serves to temper the battery, and the entering point 9. Here the switching valve 27 is positioned between the tapping point 25 and the heat exchanger 15 of the secondary train. The switching valves 27, 28 produce an additional refrigerant connection from the secondary train to the heat exchanger 4.

With the valves 6, 14, 16, 22 closed, the valve 7 opened and operating the valve 17 as expansion valve 17 the refrigerant compressed by the compressor 5 is directed to the switching valve 27 in the secondary train. The switching valve 27 closes the original secondary train and prevents the refrigerant from flowing to the condenser 15. The additional refrigerant connection from the secondary train to the switching valve 28 is opened. The refrigerant flows through the switching valve 28, which closes the refrigerant line to the compressor 5, to the heat exchanger 4. The heat of the compressed, hot refrigerant is transferred to the battery in the heat exchanger 4 that now is operated as condenser 4.

Then the refrigerant flows into the collector 8 and through the expansion valve 17 to the evaporator 2. The refrigerant decompressed and partially liquefied on passing the expansion valve 17 is evaporated again in the evaporator 2 while absorbing heat and flows from the switching valve 18, which opens the connection line 21, to the entry of the compressor 5.

In this way, the heat exchanger 2 as evaporator 2 is a heat source that transfers heat from the ambient air 12 to the refrigerant, whereas the heat exchanger 4 as condenser 4 for heating the battery of the vehicle is used as heat sink. In addition, it is also possible to use the evaporators 3, 13 as additional heat sources optionally or simultaneously with the evaporator 2, dependent on the demand. Then, in addition to the ambient air, also the waste heat of the electric drive train and/or the fresh air 11 would be used as heat sources.

It follows that in the FIGS. 5a and 5b the refrigerant circuit 1 is shown in heating mode of the battery of the vehicle.

Extending FIG. 5a, it is also possible, according to FIG. 5b, to use the condenser 15 for reheating the fresh air 11 for the vehicle interior. Accordingly, the switching valve 27 is switched such that it allows refrigerant to pass in both the directions of the switching valve 28 and the heat exchanger 15. The control valve 16 is opened. The hot refrigerant is liquefied in the condenser 15, delivering heat to the fresh air 11. The fresh air 11 then serves as a further heat sink.

Further, the fresh air 11 is also usable as heat source. In this case, the refrigerant flows from the collector 8 through the expansion valve 6 there being decompressed. Subsequently, the refrigerant is evaporated in the evaporator 3, absorbing heat from the fresh air 11 that is dehumidified and cooled before heated again on passing the condenser 15. The refrigerant flows from the outlet of the evaporator 3 to the expansion valve 22 and is, on passing the valve 22, decompressed to the pressure level of the refrigerant that leaves the evaporator 2. The partial mass flows are brought together at the entering point 24 and jointly passed to the compressor 5.

According to another embodiment also, the chiller 13 can be used as heat source for cooling further components of the electric drive train. Here, the refrigerant flows in parallel to the evaporator 3 through the evaporator 13, there absorbing heat, before being passed over the T-piece 19 to the expansion valve 22.

As heat sources, the ambient air 12, the fresh air 11, and/or the components of the electric drive train are used. At the same time, the battery of the vehicle and/or the fresh air 11 serve as heat sinks.

Figure 6A:
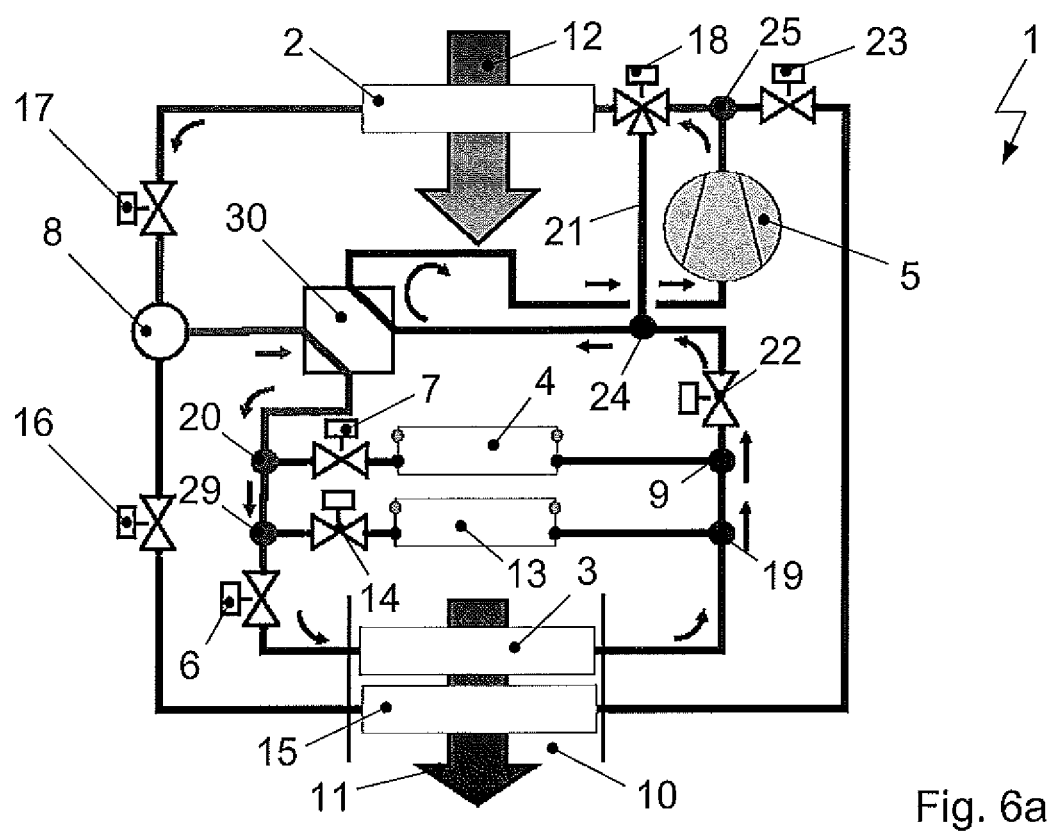
FIG. 6a: established similar to FIG. 3 with additional internal heat exchanger and operation in cooling mode.
Figure 6B:
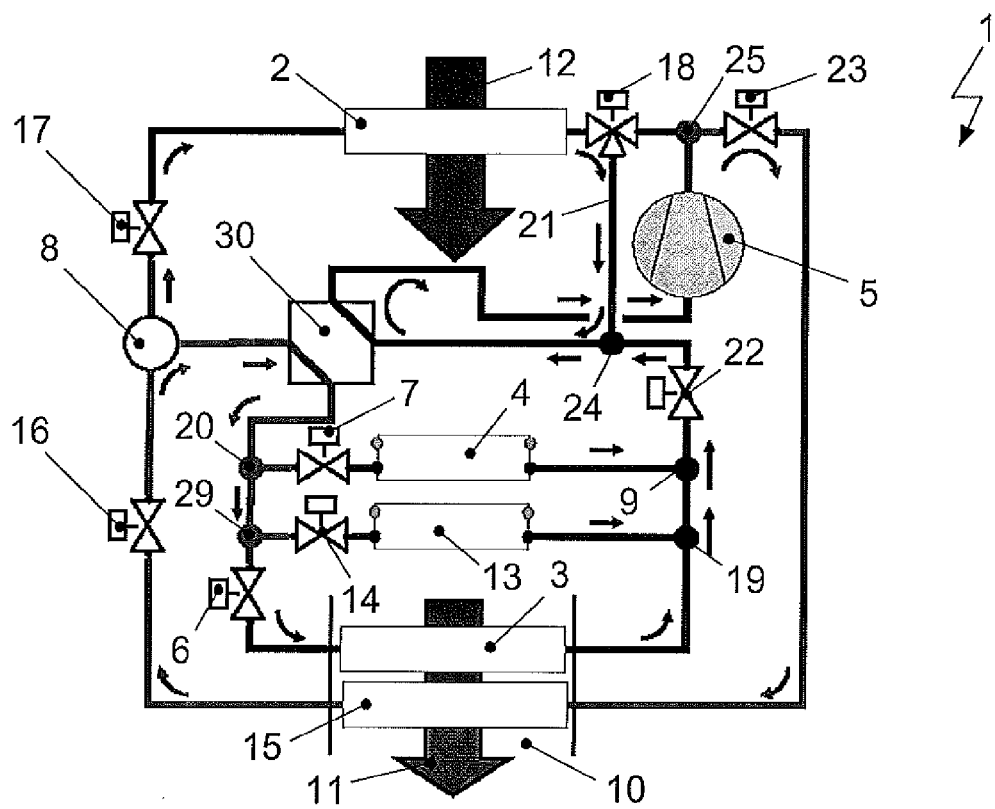
FIG. 6b: established similar to FIG. 3 with additional internal heat exchanger and operation in heating mode.
Figure 6C:
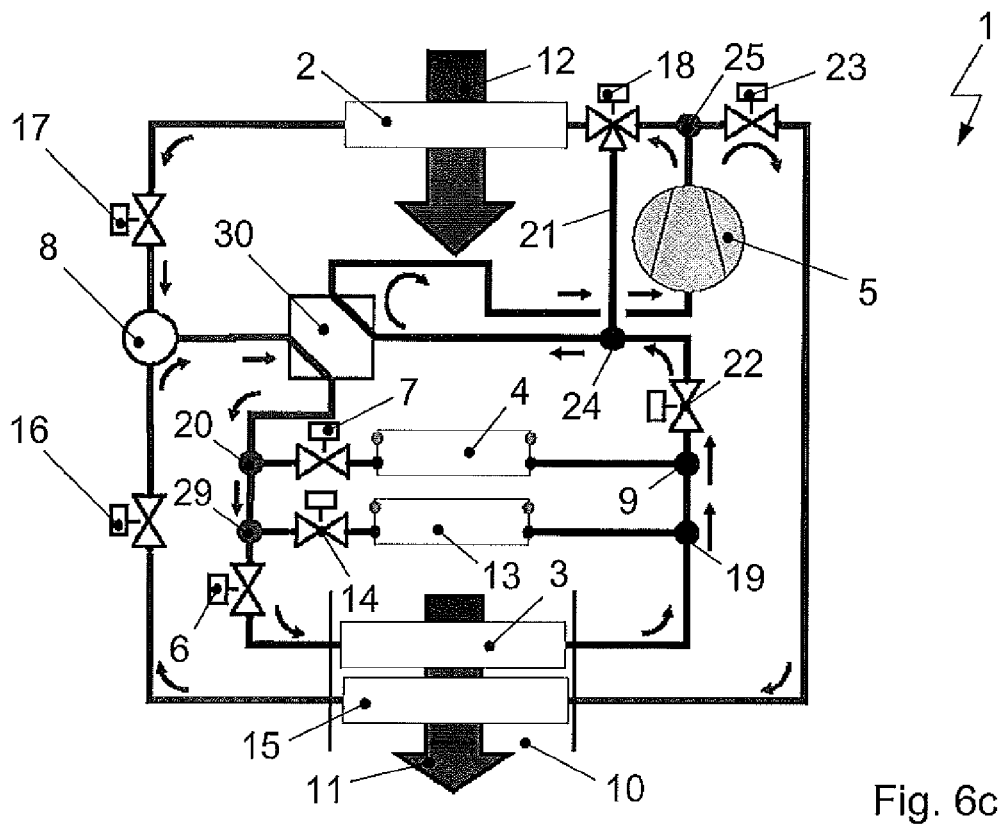
FIG. 6c: established similar to FIG. 3 with additional internal heat exchanger and operation in reheating mode.

In the FIGS. 6a, 6b and 6c, the refrigerant circuit 1 to FIG. 3, or FIG. 4b, respectively, extended by including an additional internal heat exchanger 30 is shown. Further, an additional T-piece 29 is provided for reasons of design.

The internal heat exchanger 30 functions to transfer heat between the liquid refrigerant at high pressure and the gaseous refrigerant at low pressure. On the one hand, the liquid refrigerant after having been condensed at the outflow of the collector 8 and before entering the expansion valves 6, 7, 14 is further cooled and on the other hand, the drawn in gas before entering the compressor 5 overheated.

Consequently, the internal heat exchanger 30 is with its high pressure side placed in the direction of flow of the refrigerant subsequent to the connection point 8 established as collector 8 and previous to the expansion valves 6, 7, 14. On the low pressure side, the internal heat exchanger 30 is integrated in the direction of flow of the refrigerant previous to the compressor 5 and thus, between the T-piece 24 and the entry into the compressor 5.

FIG. 6a shows the refrigerant circuit 1 while the HVAC system of the vehicle is operated in cooling mode in relation to the fresh air 11 for the vehicle interior. Hereby, the refrigerant compressed in the compressor 5 is led over the tapping point 25 and the switching valve 18 to the condenser 2 where the refrigerant is liquefied directly dissipating heat to the ambient air 12, afterwards flowing through the opened blocking valve 17 into the collector 8. The blocking valves 16, 23 are closed so that the secondary train is not supplied with refrigerant.

From the collector 8, the refrigerant flows through the high pressure region of the internal heat exchanger 30, where it is overcooled continuing to dissipate heat, divided into partial mass flows to the expansion valves 6, 7, 14. After decompression into the two-phase region, the refrigerant reaches the evaporators 3, 4, 13 and is evaporated while absorbing heat. In the evaporator 3 the fresh air 11 for the vehicle interior is cooled and/or dehumidified, directly absorbing heat, by the refrigerant. After the partial mass flows have been brought together, the refrigerant is passed through the opened valve 22 to the low pressure region of the 30 and overheated there while absorbing heat before entering the compressor 5.

In cooling mode of the HVAC system and simultaneous or optional cooling mode of the battery, the three evaporators 3, 4, 13 each are optionally or simultaneously operated as heat sources dependent on the demand. The waste heat of the battery, the waste heat of the electric drive train, and/or the fresh air 11 are used as heat sources, whereas exclusively the ambient air 12 is used as heat sink in the condenser 2.

In FIG. 6b, the refrigerant circuit 1 is shown with the HVAC system of the vehicle operated in heating mode in relation to the fresh air 11 for the vehicle interior. The refrigerant compressed in the compressor 5 flows over the tapping point 25 and through the opened blocking valve 23 to the condenser 15 where the refrigerant is liquefied directly delivering heat to the fresh air 11, afterwards flowing through the opened control valve 16 into the collector 8.

From the collector 8, the refrigerant is, first, directed through the high pressure region of the internal heat exchanger 30, where it is overcooled while further dissipating heat, divided into partial mass flows to the expansion valves 6, 7, 14 again. Another partial mass flow goes over the expansion valve 17, where on passing it is decompressed to low pressure, to the heat exchanger 2 operated as condenser 2, there being evaporated directly transferring heat with the ambient air 12. Then, the liquefied refrigerant is passed over the switching valve 18 and through the connection line 21 to the entering point 24.

After decompression in the expansion valves 6, 7, 14 to an intermediate pressure, that possibly is above low pressure and below high pressure, the refrigerant is directed into the evaporators 3, 4, 13 and evaporated while absorbing heat. In the evaporator 3, the fresh air 11 to the vehicle interior is cooled and/or dehumidified by the refrigerant under direct absorption of heat. After the partial mass flows have been brought together, the refrigerant is decompressed to low pressure on passing the expansion valve 22 and then at the entering point 24 mixed with the partial mass flow, that passed the evaporator 2, at equal pressure level.

Subsequently, the total mass flow of the refrigerant is again passed through the low pressure region of the internal heat exchanger 30 and under heat absorption overheated before reaching the compressor 5.

Thus, when various heat sources are used at the same time not the total refrigerant mass flow is passed over the high pressure side of the internal heat exchanger 30.

Furthermore, the possibility exists that when various heat sources are used at the same time, not the total refrigerant mass flow is passed over the low pressure side of the internal heat exchanger 30. In the embodiment not shown the T-piece 24, for example, would be placed in the direction of flow of the refrigerant after the low pressure side of the internal heat exchanger 30, hence, between the internal heat exchanger 30 and the compressor 5.

Also, the refrigerant mass flow is preferentially divided such that a partial mass flow passes the heat exchanger 3 that as evaporator 3 uses the fresh air 11 as heat source, at least one partial mass flow passes the heat exchanger 4 and/or the heat exchanger 13, that as chiller 4, 13 use the battery, or the electric drive train, respectively, as heat source, and a partial mass flow passes the heat exchanger 2 that as evaporator 2 uses the ambient air 12 as heat source.

The refrigerant circuit 1 has with the entering point 24 a component for bringing together the partial mass flows of the refrigerant so that all partial mass flows are brought together at a single point and the refrigerant is supplied as total mass flow to the compressor 5. Hereby, the partial mass flows that each absorb the heat from heat sources at a similar temperature level are brought together at a single point. So, first, the partial mass flows through the evaporators 3, 4, 13 are brought together at the T-piece 9. Second, the partial mass flows that absorb the heat from heat sources at a lower temperature level compared to that of the evaporators 3, 4, 13, in this case only the partial mass flow through the evaporator 2, are brought together downstream to the T-piece 9 in the direction of flow of the refrigerant and at the entering point 24 mixed with the partial mass flows that have already passed the evaporators 3, 4, 13 and have been brought together. Between the single points of bringing together the partial mass flows, established as T-pieces 9, 24, advantageously the expansion valve 22 as a preferentially externally controllable expansion member is located.

In heating mode of the HVAC system as well as simultaneous or optional cooling operation of the battery, therefore, the four evaporators 2, 3, 4, 13 each are operated as heat sources optionally or simultaneously dependent on demand. The ambient air 12, the waste heat of the battery, the waste heat of the electric drive train and/or the fresh air 11 are used as heat sources, whereas solely the fresh air 11 is used as heat sink in the condenser 15.

In FIG. 6c, the refrigerant circuit 1 is shown while the HVAC system of the vehicle is operated in reheating mode in relation to the fresh air 11 for the vehicle interior. The refrigerant compressed in the compressor 5 is over the tapping point 25 divided among the secondary train and the connection to the heat exchanger 2. One partial mass flow flows through the opened blocking valve 23 to the condenser 15 where the refrigerant is liquefied directly delivering heat to the fresh air 11, then flowing through the opened control valve 16 to the collector 8. The second partial mass flow is passed through the switching valve 18 to the condenser 2 where the refrigerant is liquefied directly dissipating heat to the ambient air 12, then flowing through the opened control valve 17 to the collector 8.

From the collector 8, the refrigerant, like in heating mode to FIG. 6a, flows through the high pressure region of the internal heat exchanger 30 where it is overcooled further dissipating heat, then divided into partial mass flows, to the expansion valves 6, 7, 14. After decompression into the two-phase region, the refrigerant reaches the evaporators 3, 4, 13 and is evaporated absorbing heat. After mixing of the partial mass flows the total mass flow of the refrigerant is passed through the opened valve 22 to the low pressure region of the internal heat exchanger 30 and overheated there while absorbing heat, before entering the compressor 5.

In reheating mode, the three evaporators 3, 4, 13 each are optionally or simultaneously operated as heat sources dependent on the demand. The fresh air 11, the waste heat of the battery and/or the waste heat of the electric drive train are used as heat sources, whereas the ambient air 12 and the fresh air 11 are used as heat sinks in the condensers 2, 15.

The versions of circuitry and operational modes described are usable for different refrigerants that on the low pressure side experience a phase transition from liquid to gaseous, while absorbing heat. On the high pressure side the refrigerant dissipates the heat by deheating, or gas cooling, respectively, with following condensation and possibly overcooling to a heat sink, such as the ambient air or the fresh air to the vehicle interior. As suitable refrigerants, for example, natural substances such as R744, as well as chemical substances, such as R134a, R152a, NFO-1234yf, are usable.

From the foregoing description, one ordinarily skilled in the art can easily ascertain the essential characteristics of this invention and, without departing from the spirit and scope thereof, make various changes and modifications to the invention to adapt it to various usages and conditions.

Nomenclature

| | |
|---|---|
| 1 | refrigerant circuit |
| 2 | heat exchanger, condenser, evaporator |
| 3 | heat exchanger, evaporator of the HVAC system |
| 4 | heat exchanger, evaporator of the battery cooling, chiller, condenser |
| 5 | compressor |
| 6, 7 | valve, expansion member, expansion valve |
| 8 | connection point, collector, high pressure collector |
| 9 | entering point, T-piece |
| 10 | air channel |
| 11 | air in vehicle interior, fresh air |
| 12 | ambient air |
| 13 | heat exchanger, evaporator cooling drive train, chiller |
| 14 | valve, expansion member, expansion valve |
| 15 | heat exchanger, condenser of the HVAC system |
| 16 | valve, blocking valve, control valve |
| 17 | valve, blocking valve, control valve, expansion valve |
| 18 | valve, switching valve |
| 19, 20 | T-piece |
| 21 | connection line |
| 22 | valve, expansion member, expansion valve |
| 23, 26 | blocking valve |
| 24 | entering point, T-piece |
| 25 | tapping point, T-piece |
| 27, 28 | switching valve |
| 29 | T-piece |
| 30 | internal heat exchanger |

The invention claimed is:

1. A refrigerant circuit for a vehicle HVAC system, comprising:
a circuit including, in order, a compressor, a tapping point, a first switching valve, a fourth heat exchanger, a refrigerant collector serving as a connection point, a first heat exchanger, a second switching valve connected to 1) the first heat exchanger, 2) an inlet of the compressor, and 3) an outlet of the compressor, and a first entering point that leads to the inlet of the compressor;
a third heat exchanger in parallel with the fourth heat exchanger, the third heat exchanger located between the first switching valve and the refrigerant collector;
a second heat exchanger in parallel with the first heat exchanger, the second heat exchanger located between the refrigerant collector and the first entering point; and
a fifth heat exchanger in parallel with the first heat exchanger and the second heat exchanger and in series with the third heat exchanger;
the refrigerant circuit configured to provide a combined cooling mode and heating mode, as well as a reheating mode for fresh air entering an interior of the vehicle.

2. The refrigerant circuit according to claim 1, wherein the connection point is positioned in a high pressure region of the refrigerant circuit, and is established for the storage of a refrigerant and for at least one of bringing together and dividing partial mass flows of the refrigerant.

3. The refrigerant circuit according to claim 1, wherein the third heat exchanger is passable bidirectionally.

4. The refrigerant circuit according to claim 3, further comprising an expansion member provided upstream of the third heat exchanger in a cooling mode.

5. The refrigerant circuit according to claim 4, wherein the expansion member is an expansion valve.

6. The refrigerant circuit according to claim 1, further comprising a first switching valve provided between the tapping point and the fourth heat exchanger, the first switching valve in communication with a second switching valve provided between the first entering point and the third heat exchanger.

7. The refrigerant circuit according to claim 1, wherein the first switching valve divides a flow of refrigerant to flow to each of the third heat exchanger and the fourth heat exchanger.

8. The refrigerant circuit according to claim 1, further comprising a connection line, the connection line extending from a valve provided between the tapping point and the first heat exchanger to a second entering point provided between the first entering point and the inlet of the compressor.

9. The refrigerant circuit according to claim 8, wherein an expansion member is provided between the first entering point and the second entering point.

10. The refrigerant circuit according to claim 9, wherein the expansion member is an expansion valve.

11. The refrigerant circuit according to claim 10, wherein the expansion valve is externally controllable.

* * * * *